United States Patent
Sanderson

(12) 
(10) Patent No.: US 6,263,810 B1
(45) Date of Patent: Jul. 24, 2001

(54) PLANTING AND HARVESTING METHOD APPARATUS

(75) Inventor: Jeffrey John Sanderson, By Forfar (GB)

(73) Assignee: Reekie Manufacturing Ltd.

( * ) Notice: Subject to any disclaimer, the term of this patent is extended or adjusted under 35 U.S.C. 154(b) by 0 days.

(21) Appl. No.: 09/502,257

(22) Filed: Feb. 17, 2000

(30) Foreign Application Priority Data

Feb. 18, 1999 (GB) .................................... 9903602

(51) Int. Cl.⁷ .................................................. A01B 79/00
(52) U.S. Cl. ............................ 111/114; 111/200; 111/900
(58) Field of Search ...................... 47/65.5, 66.7, 47/73, 75, 77, 57.5, 58.1; 111/200, 900, 114

(56) References Cited

U.S. PATENT DOCUMENTS

| 4,092,936 | 6/1978 | Griffin et al. |
| 5,222,326 | 6/1993 | Higgins ..................................... 47/73 |
| 5,522,178 | 6/1996 | Cone |

FOREIGN PATENT DOCUMENTS

| 932 388 | 8/1955 | (DE) |
| 0 607 488 A1 | 1/1993 | (DE) |
| 71.18040 | 12/1972 | (FR) |
| 582404 | 11/1946 | (GB) |
| 854321 | 11/1960 | (GB) |
| 1595250 | 8/1981 | (GB) |
| 2104763 A | 3/1983 | (GB) |
| 2 247 817 A | 3/1992 | (GB) |
| WO 97/24917 | 7/1997 | (WO) |

Primary Examiner—Christopher J. Novosad
(74) Attorney, Agent, or Firm—Young & Basile

(57) ABSTRACT

A method of planting tubers including filling or part-filling elongate tubes with soil lifted from a planting area. Seed tubers, preferably of mini-tuber size, are inserted into the soil-filled tubes after placing the tubes onto the planting area. Also claimed is a method of harvesting tubers by lifting the tubing from the planting area, removing the haulm from the tuber plants and gaining access to the tuber crop growing within the tubing by cutting/splitting away the tubing. The tuber crop is separated from the soil and collected. Machinery for performing the above planting and harvesting methods is also claimed.

17 Claims, 2 Drawing Sheets

PLANTING AND HARVESTING METHOD APPARATUS

The present invention relates to a new method for planting and harvesting root crops such as potatoes, turnips or the like. The invention also relates to new agricultural machinery for use in the new method.

The agricultural industry is facing ever increasing demands for higher productivity, improved crop quality, better yield rates, and more quality control while at the same time facing demands for reduced use of fertilizers and pesticides, and for lower costs. This is particularly the case in the potato growing industry which is increasingly being faced with such demands from large operators in the potato processing industry who are fast becoming the largest buyers of potato crops. The traditional methods for planting and harvesting potatoes can only be improved upon in small degrees and offer only limited solutions to the problems faced by farmers seeking to meet these new demands.

It is an object of the present invention to provide a new method of planting and harvesting potatoes which addresses one or more of the foregoing problems.

According to the present invention we provide a method of planting tubers comprising the steps of:
- (a) lifting soil from the surface of a planting area in which tubers are to be planted;
- (b) inserting the lifted soil into elongate tubing in order to at least partially fill, preferably substantially fill, the tubing;
- (c) laying the soil-filled tubing on the surface of the planting area; and
- (d) inserting seed tubers into the soil-filled tubing.

Preferably, step (a) comprises lifting a top layer of soil from the planting area which is, preferably, a ploughed field.

Preferably, the method further includes the step of separating out stones, clods and/or other debris from the lifted soil, prior to filling the tubing with the soil. Nevertheless, in field conditions where the soil is substantially stone-free (and clod-free) it may not be necessary to perform this stone separating step.

The method may also include the step of treating the lifted soil prior to inserting it into the elongate tubing. The treatment may, for example, take the form of steam or heat treatment to kill pests and/or diseases which may be present in the soil. Alternatively, or additionally, the soil could be treated with a pesticide, if desired, prior to inserting it into the tubing.

The tubing preferably comprises several separate elongate tubes. Step (c) preferably comprises laying the elongate tubes substantially in parallel along the surface of the field. Step (d) preferably comprises inserting the tubers individually, at regular spaced intervals along the length of each tube. Step (d) preferably further includes dispensing, or otherwise inserting, water and/or fertilizer into the tubes. This may be done by, for example, dispensing a predetermined amount of fertilizer and/or water into the tubes with each tuber which is planted in the tubes.

The elongate tubes into which the potatoes are planted are preferably made of a flexible plastics material, which may be a bio-degradable plastics material. The tubing will preferably also be air permeable, or at least oxygen and nitrogen permeable, to at least some extent. This enables oxygen and nitrogen to reach the seed tubers during the growing process. The tubing is though preferably not water permeable. This means that the seed tubers are effectively held in a contained environment inside the elongate tubes, no water or water-borne contaminants or pests present in the field itself, being allowed to enter the tubes.

The seed tubers which are planted into the tubes are preferably very small tubers which would not normally be used as potato seed. We refer to these as "mini-tubers". These mini-tubers can be used as seed in the planting method of the invention due to the fact that they will be contained in the controlled environment of the filled tube throughout the growing process and are therefore less susceptible to adverse environmental and growing conditions than they would be if they were planted in an open field in the traditional potato growing method.

According to another aspect of the invention we provide a new tuber harvesting method, for use in harvesting tubers planted according to the afore-described planting method, the method comprising the steps of:
- (e) lifting the elongate tubing off the ground;
- (f) removing haulm from the grown potato plants;
- (g) removing the tubing, for example by cutting or splitting the tubing, in order to gain access to the potato crop held therein;
- (h) separating off the soil (for example by sifting) which is, preferably, returned to the surface of the planting area; and
- (i) collecting the harvested potatoes in a container means.

The haulm is preferably removed prior to the tubing being cut away. This may be done either before or after the tubing is lifted off the ground. Alternatively, though generally not preferred, the haulm may be left on the potato plants and may be separated off with the soil, during step (h).

It will be appreciated that the harvested crop of tubers may also be graded before being collected in one or more containers.

The above-described planting method offers significant advantages over traditional tuber planting methods, particularly in the potato industry. For example, by containing the growing potatoes inside the elongate tubes throughout the full growing process, no weeds can obtain access to the inside of the tubes, where the potatoes are growing. This eliminates weed control requirements, including both mechanical and chemical weed control. Moreover, worms, pests and other disease infiltrating the planting area after the planting of the tubers in the tubes can have little or no effect on the growing tubers which are contained in their own controlled environment. Where soil treatment is used prior to filling the tubes, disease and pests can be effectively eliminated from the growing environment of the potatoes before they even start to grow. An added advantage is that only the soil which is lifted up into the machinery need be treated in this way: it is not necessary to treat the whole field.

Another advantage of the method is that it offers easy soil testing and quality control for supermarkets/potato processors. Since the potatoes are grown entirely inside the tubes 6, soil quality in the tubes can be easily tested to give an accurate indication of mineral/chemical content etc.

So-called "greening" of the potato crop is also substantially avoided using this new planting technique, since the tubers are contained and shielded by the tubes throughout the growing process.

The invention also offers reduced requirements for fertilizer and water, since the exact predetermined amount of each which is needed to grow each seed tuber can be pre-calculated and injected into the elongate tubes. The water and fertilizer is thus targeted directly on each seed tuber: there is no need to water and fertilize the entire field.

The above-described harvesting method for harvesting the tubers from the elongate tubes, once growing is complete, also has the advantage of minimising mechanical damage to the crop during the harvesting process. Damage to the potato crop inflicted during harvesting is one of the main causes of loss of yield. Even one slightly damaged or bruised potato can lead to significant numbers of "bad" potatoes which are of no use to potato processors or end consumers. Much damage can be inflicted upon potatoes during the traditional harvesting methods where the tubers must be ploughed up out of the ground and conveyed into the harvester before they can be separated and graded. In the new method of the present invention, the tubes can be easily lifted into the harvester and the loose soil (from which the stones have already been removed) only needs to be sifted off the tubers once the tubing is cut away.

Further advantages of the new planting and harvesting methods of the invention include reduced problems experienced during harvesting, such as problems often experienced in traditional harvesting methods where weather conditions are bad and the soil is wet, heavy and difficult to plough up and handle: in the present invention it will be appreciated that there is no sub-soil engagement required during the harvesting process. The invention also offers the possibility of; simpler machinery design for planting and harvesting, including reduced weight of the harvester itself, both leading to reduced soil compaction (under the harvester) and reduced fuel requirements; relatively easy haulm removal; and easier grading and separating, and reduced picking staff requirements. Additionally, the above-described methods offer the possibility of reduced crop rotation cycles, as well as potentially allowing more rows of potatoes to be grown per acre, than with normal planting/harvesting methods.

According to another aspect of the invention, we provide mobile agricultural machinery for use in a planting process, the machinery comprising: ground traversing means; soil lifting means at a forward end of the machinery, for lifting soil into the machinery; tube filling means for inserting lifted soil into the mouth of at least one elongate tube means which is held in the machinery during use thereof; and tubing deployment means for deploying the free end of said at least one soil-containing tube means out of the rear of the machinery.

The machinery preferably further includes stone separating means for separating out stones, clods and/or other debris from the lifted soil, prior to the soil being inserted into the tube means.

According to a further aspect of the invention we provide mobile tuber planting machinery comprising; ground traversing means; container means for holding seed tubers to be planted and provided with dispenser means for dispensing seed tubers from the container means; piercing means for piercing holes in soil-filled tubing lying on the surface of the ground; and seed tuber inserting means for inserting seed tubers dispensed from the container means individually into the tubing, via said holes pierced therein.

The tuber planting machinery preferably further includes a water storage means and/or fertilizer storage means for carrying water and/or fertilizer in the tuber planting machinery, and dispensing means, or inserting means, for dispensing stored water and/or fertilizer into the soil-filled tubes, via the holes pierced therein. The dispensing, or other inserting, means is preferably formed and arranged to dispense a shot of water and/or fertilizer into each hole pierced in the tubes together with, or immediately after, a said seed tuber has been inserted therein.

According to yet another aspect of the invention we provide mobile harvesting machinery comprising: ground traversing means; lifting means for lifting at least one elongate tube, containing soil and tubers, up off the ground; tubing removing means for removing the tubing in order to obtain access to the soil and tubers contained therein; and separator means for separating out the soil from the harvested tubers.

The lifting means may conveniently comprise at least one lifting share formed and arranged for sliding under one end of a said elongate tube lying on the ground so as to lift this end of the tube up into the harvesting machinery. The tubing removing means may comprise cutting means for cutting away the tubing so as to free the soil and tubers contained therein. The machinery is formed and arranged for travelling forwardly along the ground, parallel to the length of the elongate tube, so as to continuously lift a new portion of the elongate tube into the machinery and cut away that portion of the tube, until the whole tube has been lifted and cut away.

The harvesting machinery may also include tuber grading means for grading the tubers separated out from the soil, prior to passing the (graded) tubers to one or more containers e.g. hoppers, or to a sorting table.

The harvesting machinery may further include haulm removing means for removing haulm from the potato plants before the tubing is cut away. The haulm removing means may, for example, comprise a specially configured cutting or pulling tool formed and arranged so as to be located generally immediately above the elongate tubing as it passes into the harvesting machinery and to cut off, and/or pull out, the haulm as the elongate tube moves past the tool, into the harvesting machine.

Alternatively, we may provide separate mobile haulim removing machinery incorporating such a specially configured cutting or pulling tool, for removing the haulm prior to harvesting the elongate tubes with the harvesting machinery.

Preferred embodiments of the invention will now be described by way of example only and with reference to the accompanying drawings in which:

FIGS. 1–6 illustrate the various stage of a radical new method for planting and harvesting potatoes, or other root crops, on an industrial scale. The method comprises four main stages, as described herebelow.

First Stage

Figure 1:
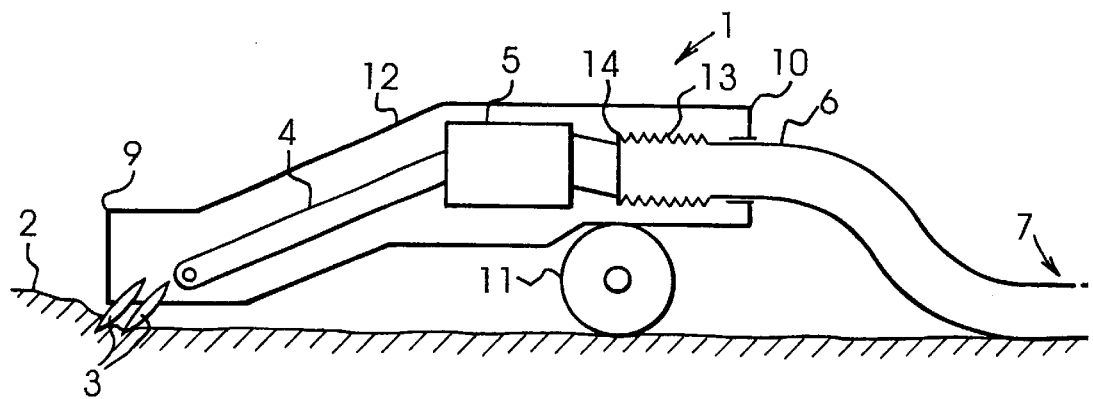
FIG. 1 is a cross-sectional schematic side view of a new tube-filling machine in use in a planting process according to the invention.

FIG. 1 illustrates the first stage of the method. In this first stage, a mobile machine 1 enters a ploughed field in which potatoes are to be cultivated. The machine has wheels 11 and a chassis 12 which is pulled from its front end 9 by a tractor (not shown). The machine 1 is specially designed to lift up a top layer of soil from the ploughed surface of the field into the machine 1 as it travels along the ground 2. Shares 3 at the front end 9 of the machine 1 lift the soil up off the ground and onto a conveyor 4 in the machine which conveys the lifted soil upwardly to a stone separator 5 in the machine.

The separator (shown in block form only in FIG. 1) is a conveyor web separator such as those commonly used in potato harvesting and generally well known to the man skilled-in-the-art. The stone separator separates out large stones, clods and other debris which may be present in the soil which is lifted into the machine.

The machine 1 is also adapted to funnel or otherwise insert the (de-stoned) soil into a long tube 6 of flexible plastic (e.g. made from plastic sheeting). Each tube 6 is initially held in compressed, concertina-like, fashion 13 inside the machine 1. One open end 14 of the tube is held firmly by a gripping tool (not shown) in the machine 1, while the other end of the tube, which is a closed end, is free and is displaced rearwardly as the tube is filled with soil.

Figure 2:
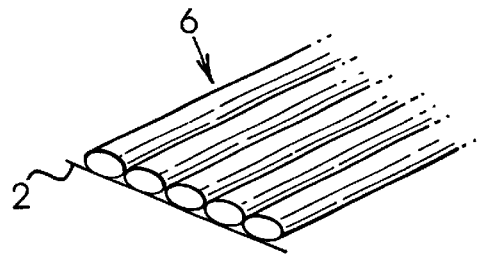
FIG. 2 is a plan perspective view illustrating a series of elongate soil-filled tubes lying in a field.

As each tube 6 is being filled, the filled portion 7 of the soil-filled tube is fed out of the rear end 10 of the machine, guide by a generally cylindrical outlet 15 provided in the rear end 10 of the machine 1. Thus, as the machine moves across the field the tube 6 filled with soil is guided out of the rear end 10 of the machine 1 so as to be laid in a generally straight manner along the surface of the field. When the tube 6 is completely filled, the gripping means releases the end of the tube (which may first be sealed closed, if the machine 1 includes closing means which may optionally be provided for this purpose). The machine 1 is used to fill a multitude of such tubes so that the field is ultimately covered with parallel plastic tubes, each being filled with soil, as illustrated in FIG. 2. It will be appreciated that gaps may be left between some of the tubes to allow for the wheels of the harvester (which will later be used to harvest the grown potato crop, as described below).

It will be appreciated that the machine 1 can be re-filled with more plastic tubing 6, as necessary, by the farmer/machine operator. The seed potatoes will be planted in these elongate tubes and the potato crop will grow in them throughout the full growing process.

In conditions where the soil contains little or no stones this tube-filling machine 1 may not need to incorporate a separator for removing stones and the soil lifted from the field may instead be passed directly to be inserted into the tubes.

Second Stage

The second stage in the method comprises planting seed potatoes into the soil-filled tubes 6 lying in the field. A specially adapted planting machine 20 is provided f or this process. The planting machine 20 has wheels 21 and is designed to be pulled (by its front end 23) behind a tractor (not shown). The planting machine 20 incorporates a piercing tool 22, which is in this embodiment in the form of a hole punching knife or tool, which is designed to automatically pierce holes in a soil-filled tube 6, as the planting machine moves along the length of the tube 6, the holes being pierced at regular intervals S along the length of the tube. Control means, which may be mechanical or electrical, drive the tool 22 up and down at the required regular time intervals, to create the regularly space holes in the tube 6.

The planting machine 20 also incorporates a hopper 24 full of seed potatoes 26 and a dispensing unit 28 connected thereto which is adapted to dispense at least one seed potato 26 into each hole pierced in the tube. The seed potatoes used are "mini-tubers". These are very small potatoes, generally not considered big enough for eating, and not normally used as seed potatoes, having a size typically in the range of approximately 3 cm to 5 cm in diameter. The hopper 24 is disposed rearwardly of the piercing tool 22, so as to dispense the seed potatoes into the already pierced holes in the tube, as the planting machine moves along the length of the tube.

The planting machine is also be designed to carry fertilizer and/or water 30 (or a fertilizer solution) in one or more reservoirs 29, and is adapted to insert a predetermined quantity of the water and/or fertilizer into the tube 6, through the pierced hole in the tubing through which the seed potato 26 has been planted into the tube. The water and/or fertilizer may be inserted either after, or simultaneously with, the planting of the seed potato into the tube. In this embodiment the water and/or fertilizer is dispensed as a predetermined "shot", from an outlet 32 of the reservoir 29, into each hole pierced in the tube 6. (In an alternative possible embodiment the planting machine is adapted to inject the water and/or fertilizer solution into the tube 6.)

The plastic sheeting used for the tubes will in generally be substantially non-water permeable and thus the growing potatoes are held in a contained environment in the tube so that disease cannot get to the potatoes. However, some permeation in the tubes should be provided in order to allow sufficient oxygen/nitrogen to reach the growing potatoes. Additionally, irrigation hoses may, if desired, be laid on top of the plastic tubes 6 once they have been laid on the field, with water nozzles being placed adjacent to the holes perforated in the tubes (into which the mini tubers were planted), in order to allow further irrigation of the planted crop during the growing season.

Figure 3:
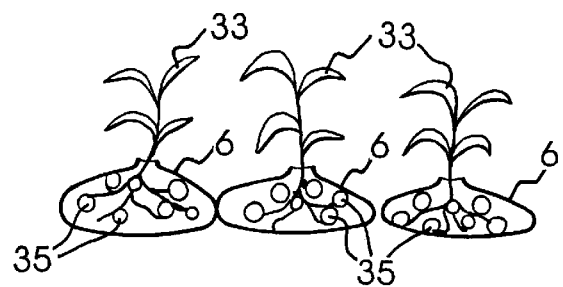
FIG. 3 is an end view of three of the tubes of FIG. 2, showing potato plants growing therein.
Figure 4:
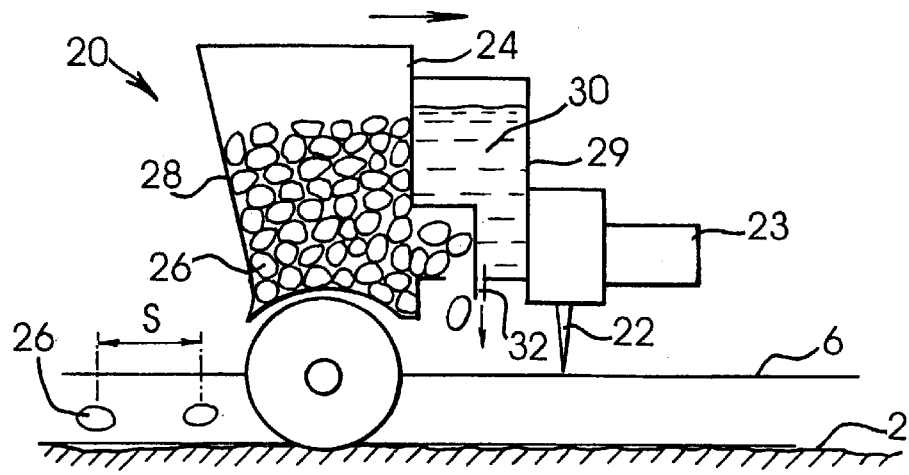
FIG. 4 is a schematic side view of a new planting machine in use in planting seed tubers in the elongate tubes of FIG. 2.

The planted tubers will grow in the tubes, the potato plant stalks and leaves 33 growing up out of the hole pierced in the tube 6 (through which the seed tuber 26 was inserted), as illustrated in FIG.3 which is an end view of three parallel tubes 6. The potatoes 35 which grow from the plant are held inside the tube 6, in the controlled environment provided by the tubes 6. Once the potatoes are ready to be harvested, the third stage of the process is carried out as follows.

Third Stage

Figure 5:
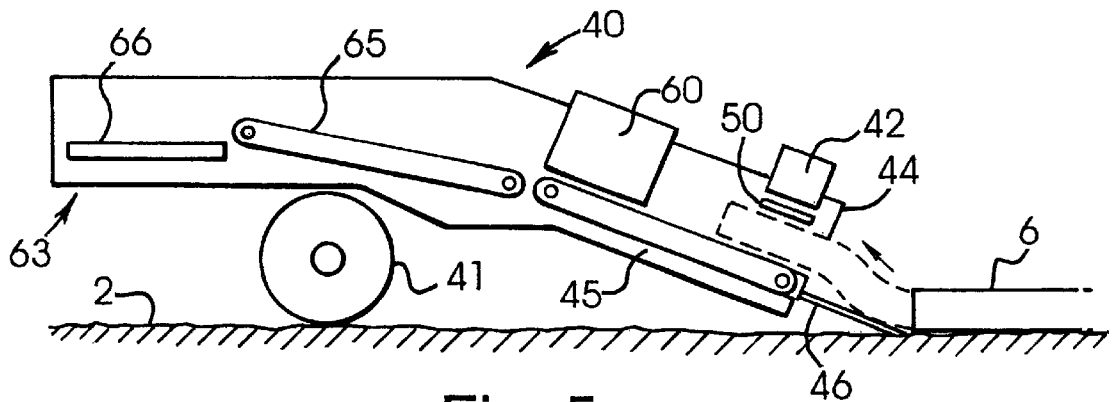
FIG. 5 is a schematic side view of a new type of harvester in use in harvesting potatoes grown in the elongate tubes.

The third stage in the method is the removal of haulm from the crop. In the present described embodiment, this is carried out as part of the harvesting process, in a special harvester 40, illustrated in FIG. 5, which is used to harvest the crop. The harvester 40 has wheels 41 and is designed to be pulled, by its front end 43, behind a tractor (not shown). A lifting share 46 is mounted at a lower portion of the front end 43 of the harvester, which is designed to slide below a soil-filled tube 6 and cause it to be lifted forwardly and upwardly into the harvester 40, onto a conveyor unit 45.

Figure 6:
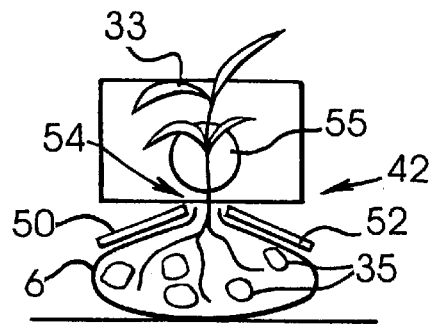
FIG. 6 is an end view of one of the elongate tubes and a haulm removing tool.

A specially configured haulm removal unit 42 is mounted at a front end portion 44 of the harvester 40, just behind the lifting share. This special unit 42 is formed and arranged to remove the haulm (i.e. potato plant stalk and leaves 33), by cutting off and/or pulling out, the haulm as each tube 6 moves past this unit. This unit 42 is shown in further detail, in end view, in FIG. 6. The unit 42 includes a cutting tool in the form of two blade portions 50,52 which are configured to slide easily over the profile of the filled tubes 6, the blades being spaced apart from each other sufficiently to provide a thin channel 54 into which the haulm stalks are directed, which causes the haul to be cut and/or wrenched away from the tubes, which pass on, forwardly and upwardly, into the harvester 40, up a conveyor 45 provided for this purpose. The haul removal unit 42 may, optionally, include vacuum means 55 for sucking up the waste haulm and disposing it (either back to the field, or to a waste collection container carried in the harvester).

Fourth Stage

Once the haulm 33 has been removed, the fourth stage in the inventive method is the retrieval of the potatoes. For this purpose, a specially configured tubing remover unit 60 is provided for removing the plastic tubing (e.g. by cutting or splitting it apart), from each tube 6, and a separator web conveyor 65 (again, of generally known type) is provided, immediately behind the tubing remover unit 60, for sifting out the soil and conveying the potatoes upwardly and onto a picking table 66 at a rear end 63 of the harvester 40. From the picking table the (selected) potatoes may be conveyed to a hopper carried in the harvester, or by a tractor/trailer travelling alongside the harvester). The tubing remover unit 60 is designed to cut or split apart the plastics tubing to release the potatoes and soil contained therein, which passes onto the separator web 65.

As the harvester moves forwardly, down the length of the field, the lifted tube 6 is continuously being fed up into the machine, the haulm being removed, and the tubing being split/cut away, until the entire tube has been harvested in this manner.

In another possible embodiment, the separator web 65 may be replaced with (or there may additionally be provided) a grader unit (of any generally known type) for grading the potatoes, before they go to the picking table.

It will be appreciated that various modifications to the above-described embodiments are possible without departing from the scope of the invention. In particular, the machinery used in the planting and harvesting may be designed to process more than one of the elongate tubes at a time. For example, the tube-filling machine may be designed to fill more than one tube at once i e. there may be several tube holding means in the machine 1 and respective soil funneling/inserting means to enable several tubes to be filled simultaneously and fed out the rear end 10 of the machine 1, in parallel, onto the ground 2. Similarly, the planting machine may be provided with several tube piercing means, aligned in parallel, for simultaneously punching holes in several parallel tubes, the seed tuber dispenser also being formed and arranged to dispense seed tubers simultaneously into the several parallel tubes. Similarly again, the harvester may be designed to lift more than one tube at the same time, there being a plurality of lifting shares, haulm removal means, and tube cutting means in the harvester to perform the necessary operations on the lifted tubes simultaneously.

Moreover, it will be appreciated that the tube-filling machine 1, the planting machine and/or the harvester may be engine or motor driven so as to be independent, self driven, vehicles rather than requiring to be pulled by a tractor or other driving vehicle.

Additionally, it is also envisaged that the haulm removal process could, rather than being carried out in the harvester, be carried out by an additional, specially designed, mobile machine incorporating one or more of the special haulm removal units 42 as afore-described. In this method, the haulm would be removed from all the tubes lying in the field, before the harvester is used to lift the tubes up and cut away the plastics tubing.

Furthermore, instead of using several separate tubes 6 it may alternatively be possible to use a single, very long tube which is bent at each end (as it is laid upon the ground) so as to reverse in direction and lie parallel with itself, thus effectively creating several parallel rows of tubing.

What is claimed is:

1. A method of planting tubers comprising the steps of:
    (a) lifting soil from the surface of a planting area in which tubers are to be planted;
    (b) inserting the lifted soil into elongate tubing in order to at least partially fill the tubing;
    (c) laying the soil-filled tubing on the surface of the planting area; and
    (d) inserting seed tubers into the soil-filled tubing.

2. A method as claimed in claim 1, wherein step (a) comprises lifting a top layer of soil from the planting area.

3. A method as claimed in claim 2, further including the step of separating out stones, clods and/or other debris from the lifted soil, prior to filling the tubing with the soil.

4. A method as claimed in claim 2, wherein said lifted soil is inserted into said elongate tubing in order to substantially fill said tubing.

5. A method as claimed in claim 2, wherein there is included a further step of treating the lifted soil prior to inserting it into the elongate tubing.

6. A method as claimed in claim 2, wherein step (c) comprises laying a plurality of separate elongate tubes substantially in parallel along the surface of the planting area.

7. A method as claimed in claim 2, wherein step (d) further includes dispensing, or otherwise inserting, water and/or fertilizer into the tubes.

8. A method according to claim 2, wherein the seed tubers (26) used are "mini-tubers" having diameters in the range of from 3 to 5 cm.

9. A method as claimed in claim 1, further including the step of separating out stones, clods and/or other debris from the lifted soil, prior to filling the tubing with the soil.

10. A method as claimed in claim 1, wherein said lifted soil is inserted into said elongate tubing in order to substantially fill said tubing.

11. A method as claimed in claim 1, wherein there is included a further step of treating the lifted soil prior to inserting it into the elongate tubing.

12. A method as claimed in claim 11 wherein said further step of treating the lifting soil comprises steam or heat treatment to kill pests and/or diseases which may be present in the soil.

13. A method as claimed in claim 11, wherein said further step comprises treatment of the lifted soil with a pesticide prior to inserting the soil into the tubing.

14. A method as claimed in claim 1, wherein step (c) comprises laying a plurality of separate elongate tubes substantially in parallel along the surface of the planting area.

15. A method as claimed in claim 14, wherein step (d) comprises inserting the tubers individually, at regular spaced intervals along the length of each tube.

16. A method as claimed in claim 1, wherein step (d) further includes dispensing, or otherwise inserting, water and/or fertilizer into the tubes.

17. A method according to claim 1, wherein the seed tubers (26) used are "mini-tubers" having diameters in the range of from 3 to 5 cm.

* * * * *